United States Patent
Bosworth et al.

(10) Patent No.: US 8,312,429 B2
(45) Date of Patent: Nov. 13, 2012

(54) CELL BASED DATA PROCESSING

(75) Inventors: Adam Bosworth, Mercer Island, WA (US); David Bau, III, Gladwyne, PA (US); Kenneth Eric Vasilik, Redmond, WA (US)

(73) Assignee: Oracle International Corporation, Redwood Shores, CA (US)

( * ) Notice: Subject to any disclaimer, the term of this patent is extended or adjusted under 35 U.S.C. 154(b) by 1653 days.

(21) Appl. No.: 09/741,219

(22) Filed: Dec. 19, 2000

(65) Prior Publication Data
US 2002/0133808 A1    Sep. 19, 2002

Related U.S. Application Data

(60) Provisional application No. 60/246,915, filed on Nov. 10, 2000.

(51) Int. Cl.
*G06F 9/44* (2006.01)
(52) U.S. Cl. .......................................... 717/115
(58) Field of Classification Search .......... 717/106–115, 717/130–133, 141–144, 140; 707/10, 2–6, 707/100–102; 715/513, 514, 500; 709/201–203, 709/227, 217–218, 246, 310; 714/38
See application file for complete search history.

(56) References Cited

U.S. PATENT DOCUMENTS

| | | | |
|---|---|---|---|
| 5,428,792 A | 6/1995 | Conner et al. | |
| 5,428,793 A | 6/1995 | Odnert et al. | |
| 5,586,330 A | 12/1996 | Knudsen et al. | |
| 5,590,331 A | 12/1996 | Lewis et al. | |
| 5,630,137 A | 5/1997 | Carney et al. | |
| 5,845,121 A | 12/1998 | Carter | |
| 5,930,512 A | 7/1999 | Boden et al. | |
| 5,946,487 A | 8/1999 | Dangelo | |
| 6,066,181 A | 5/2000 | DeMaster | |
| 6,101,511 A * | 8/2000 | DeRose et al. | 715/514 |
| 6,115,741 A | 9/2000 | Domenikos et al. | |
| 6,167,565 A | 12/2000 | Kanamori | |
| 6,260,078 B1 | 7/2001 | Fowlow | |
| 6,292,936 B1 | 9/2001 | Wang | |
| 6,308,224 B1 | 10/2001 | Leymann et al. | |
| 6,327,624 B1 | 12/2001 | Mathewson, II et al. | |
| 6,339,839 B1 | 1/2002 | Wang | |
| 6,438,540 B2 * | 8/2002 | Nasr et al. | 707/3 |
| 6,442,748 B1 | 8/2002 | Bowman-Amuah | |

(Continued)

OTHER PUBLICATIONS

Bex et al., "A Formal Model for an Expressive Fragment of XSLT", Jul. 2000, First International Conference on Computational Logic, Imperial College, UK.*

(Continued)

*Primary Examiner* — Tuan A Vu
(74) *Attorney, Agent, or Firm* — Squire Sanders (US) LLP

(57) ABSTRACT

A data processing program is specified using a specification having a number of cell specifications specifying a number of data processing cells, with each data processing cell having a formula specifying an action or a computation. A cell may have one or more attributes referencing other cells. A cell formula may reference a value of another cell or be executed conditionally. In one embodiment, one of the cell is reserved as an output cell specifying the output, and a mnemonic is reserved for providing input to the specified data processing. An execution analyzer is provided to analyze the data processing specification, and identify the execution order of the cells. Further, an execution engine is provided to effectuate the specified data processing by executing the specified actions/computations of the cells in accordance with the determined execution order.

15 Claims, 5 Drawing Sheets

U.S. PATENT DOCUMENTS

| | | | |
|---|---|---|---|
| 6,546,477 B1 | 4/2003 | Russo et al. | |
| 6,581,062 B1* | 6/2003 | Draper et al. | 1/1 |
| 6,675,353 B1 | 1/2004 | Friedman | |
| 6,675,354 B1* | 1/2004 | Claussen et al. | 715/513 |
| 6,678,724 B2 | 1/2004 | Nakajima et al. | |
| 6,721,727 B2* | 4/2004 | Chau et al. | 707/3 |
| 6,732,330 B1 | 5/2004 | Claussen et al. | |
| 6,993,657 B1* | 1/2006 | Renner et al. | 713/182 |
| 7,203,866 B2* | 4/2007 | Di Fabbrizio et al. | 714/38.12 |
| 2002/0049788 A1* | 4/2002 | Lipkin et al. | 707/513 |
| 2002/0059345 A1* | 5/2002 | Wang et al. | 707/513 |
| 2002/0069399 A1 | 6/2002 | Miloushey et al. | |
| 2002/0073080 A1* | 6/2002 | Lipkin | 707/3 |
| 2002/0073399 A1 | 6/2002 | Golden | |
| 2002/0087571 A1* | 7/2002 | Stapel et al. | 707/100 |
| 2002/0099867 A1 | 7/2002 | Wilkinson et al. | |
| 2002/0120685 A1* | 8/2002 | Srivastava et al. | 709/203 |
| 2002/0129000 A1 | 9/2002 | Pillai et al. | |
| 2002/0184308 A1 | 12/2002 | Levy et al. | |
| 2002/0188547 A1 | 12/2002 | Banerjee et al. | |
| 2003/0121000 A1 | 6/2003 | Cooper et al. | |
| 2004/0028049 A1 | 2/2004 | Wan | |
| 2004/0049374 A1 | 3/2004 | Breslau et al. | |
| 2004/0177062 A1 | 9/2004 | Urquhart et al. | |
| 2008/0066059 A1 | 3/2008 | Pugh et al. | |

OTHER PUBLICATIONS

Bex et al., "Expressive Power of XSLT", Jul. 2000, International Conference on Computation Logic, <http://citeseer.ist.psu.edu/bex00expressive.html>.*

W3C, 'XML Path Language (Xpath)' and 'XSL Transformation (XSLT) Version 1.0', W3C Recommendation Nov. 16, 1999, respectively < http://www.w3.org/TR/1999/REC-xpath-19991116 > and < http://www.w3.org/TR/xslt>, pp. 1-43; pp. 1-110.*

Beech et al.,"A Formal Data Model and Algebra for XML", Feb. 2000, <http://elib.cs.berkeley.edu/seminar/2000/20000207.pdf>.*

Bex et al., "A Formal Model for an Expressive Fragment of XSLT", First International Conference of Computational Logic, London, Jul. 2000, Proceedings; Springer-Verlag, pp. 1137-1151.*

Search Extract, (13 pages) Chapter: First International Conference on Computational Logic.*

Bex et al., "A Formal Model for an Expressive Fragment of XSLT", First International Conference of Computational Logic, London, Jul. 2000, Proceedings; Springer-Verlag; pp. 1137-1151.*

Bex et al., "A Formal Model for an Expressive Fragment of XSLT", CL 2000: 1$^{st}$ International Conference 2000, vol. 1861/2000, p. 1137-1151, Springer-Verlag <http://doclib.uhasselt.be/dspace/handle/1942/616>.*

W3C, 'XML Path Language (Xpath)' and XSL Transformation (XSLT) Version 1.0; W3C Recommendation—Nov. 16, 1999; pp. 1-90.*

XSL Transformation (XSLT) Version 1.0; W3C Recommendation Nov. 16, 1999, pp. 1-90.*

Kind, et al., Multi-Lingual Threading, IEEE, Jan. 21-23, 1998, pp. 431-437.

Ansari, et al., "Executing Multidatabase Transactions", IEEE, Jan. 7-10, 1992, pp. 335-346, vol. 2.

Dinitto, "Future Directions in Programming Languages", IEEE, Oct. 9-13, 1988, pp. 169-176.

Wallace, et al., "Haskell and XML: Generic Combinators or Type-Based Translation?", ACM Sep. 1999, pp. 148-159.

* cited by examiner

| Cell | Condition | Cell |
|---|---|---|
| A | Cond1 | B |
| A | Cond2 | C |
| B | Cond3 | D |
| B | Cond4 | E |
| C | N/A | D |
| D | N/A | F |
| E | N/A | F |

CELL BASED DATA PROCESSING

RELATED APPLICATIONS

This non-provisional application is related to and claims priority to provisional application No. 60/246,915, entitled "A Data Processing Method Employing Cell Based Data Flow Description", filed on Nov. 10, 2000, which is hereby fully incorporated by reference.

BACKGROUND OF THE INVENTION

1. Field of the Invention

The present invention relates to the field of data processing. More specifically, the present invention relates data processing specification and execution.

2. Background Information

Ever since the invention of the first computer, computer scientists have continuously tried to improve the productivity of programmers, such that more applications can be developed to take advantage of the continuous advancements being made in the art of computer and related technologies. First assembler languages were developed to replace machine languages. Then, high level languages, such as FORTRAN, COBOL, PL/I and so forth, were developed to further improve the productivity of programmers. Development of high level languages were followed by structured languages such as Pascal and C, and then object oriented programming languages such as C++. To facilitate development of the Internet and the World Wide Web, "new" languages such as the Hypertext Markup Language (HTML), Java, Javascript, Perl and CGI were developed.

While great strides had been made in the past decades, advancements in integrated circuit, computer architecture, telecommunication and networking technology continue to outpace the productivity improvement of the programming community. Application development remains substantially a bottleneck to the introduction and application of the latest computer and related technology advancements. Notwithstanding the development of "power user" type of application development languages/facilities, such as Visual Basic, and the continuing improvement and extension to the more traditional languages, a need still exist for a more user friendly way in development data processing applications, for the more average, non-advanced users.

SUMMARY OF THE INVENTION

In accordance with the present invention, a data processing program is specified by way of a specification having a number of cell specifications specifying a number of data processing cells, with each data processing cell having a formula specifying an action or a computation. A cell may have one or more attributes referencing other cells. A cell formula may also reference a value of another cell or be executed conditionally.

In one embodiment, one of the cells is reserved as an output cell specifying the output, and a mnemonic is reserved for providing input to the specified data processing.

In one embodiment, an execution analyzer is provided to analyze the data processing specification, and identify the execution order of the cells. Further, an execution engine is provided to effectuate the specified data processing by executing the specified actions/computations of the cells in accordance with the determined execution order.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as data, values, tags, references, and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system include general purpose as well as special purpose data processing machines, systems, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

Overview

Figure 1:
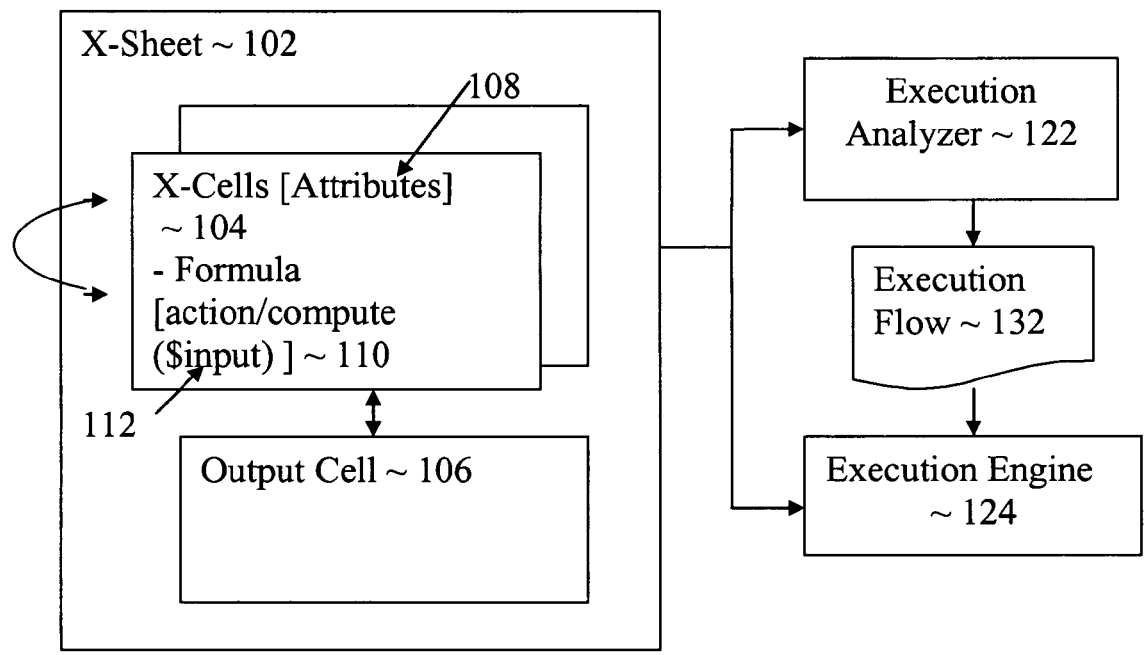
FIG. 1 illustrates an overview of the x-sheet data processing specification of the present invention, including the x-sheet execution analyzer and the x-sheet execution engine of the present invention, in accordance with one embodiment.

Referring now FIG. 1, wherein a block diagram illustrating an overview of the x-sheet data processing specification of the present invention, including a x-sheet execution analyzer and a x-sheet execution engine of the present invention, in accordance with one embodiment. In accordance with the present invention, x-sheets 102 (pronounced "cross sheets") are advantageously employed to specify data processing programs. As illustrated, each x-sheet 102 includes a number of x-cells 104 (pronounced "cross cells"), with each x-cell 104 including one or more formulas 110, and each formula 110 specifying an action or a computation to be performed (when the x-cell is executed). Each x-cell 104 may include one or more attributes 108 referencing other x-cells 104. Similarly, each formula 110 may also reference values of other x-cells 104. In other words, from at least the execution point of view, x-cells 104 may be inter-dependent or interlocked with one other, thus the name "x-cell" and "x-sheet".

As illustrated, for the embodiment, a x-sheet execution analyzer 122 is also advantageously provided to analyze the x-sheets 102, in particular, determining the execution flow of their x-cells 104, "documenting" the flows in execution flow descriptions 132. Further, a x-sheet execution engine 124 is provided to execute the x-cells 104 in accordance with the determined execution flow.

As a result, data processing operations may be advantageously specified and effectuated in a much more user friendly manner. These elements, x-sheet 102, x-cell 104, execution analyzer 122, execution flow description 132, execution engine 124, and the manner they relate, interact and/or cooperate with each, will be described in further detail in turn below.

X-Sheet and X-Cells

Turning now first to x-sheets 102 and x-cells 104 of the present invention, and still referring to FIG. 1, as described earlier, each x-sheet 102 is employed to specify a data processing program, including a number of x-cells 104, with each x-cell 104 specifying an action or a computation to be performed. Through their references to each other, via their attributes or their formulas, x-cells 104 are inter-dependent or interlocked with one other.

In one embodiment, x-cells 104 are delineated by beginning and ending x-cell tags, such as <x:xcell> and </x:xcell>, similar to tags employed by HTML and XML data structures (for familiarity purpose). Further, each x-cell 104 is uniquely named using a "name" attribute. One of the x-cells 104 is reserved as the output cell for outputting the result or results of the specified data processing. Consider the following example x-sheet,

```
<x:xsheet>
    <x:xcell name="preferences">
        <mydata>
            <favoritecolor>red</favoritecolor>
            <favoritetoy>ballon</favoritetoy>
        </mydata>
    </x:xcell>
    <x:output>
        <x: value-of select="$preferences/mydata/favoritecolor"/>
        <x: value-of select="$preferences/mydata/favoritetoy"/>
    </x:output>
</x:xsheet>
```

In the above example, the example x-sheet includes two x-cells. The first x-cell is named "preferences", whereas the second is the reserved "output" x-cell. X-cell "preferences" includes two formulas, one specifying a constant, "red" (as the favorite color), and the other specifying a constant "balloon" (as the favorite toy). The output x-cell also includes two formulas, specifying two output actions and referencing the values of x-cell "preferences" (i.e. the favorite color constant and the favorite toy constant). Accordingly, when executed, x-cell "preferences" is executed first, creating the constant values "red" and "balloon", and then the output x-cell is executed, outputting the string "red balloon". [The use of a formula to reference values of other x-cells, and the meaning of the expressions "value of" as well as "select" will be further described later.]

As described earlier, in addition to the formulas 110 of x-cells 104 being able to reference values of the x-cells 104, the x-cells 104 themselves, via attributes 108, may also reference the other x-cells. More specifically, a special "use" attribute is reserved for such purpose. Consider the following example x-sheet,

```
<x:xsheet>
    <x:xcell name="calculate" uses="$action $setup">
        <something/>
    </x:xcell>
    <x:xcell name="action" uses="$init">
        <another/>
    </x:xcell>
    <x:xcell name="setup">
        <x:value-of select="$init/yetanother"/>
    </x:xcell>
    <x:xcell name="init">
        <yetanother/>
    </x:xcell>
    etc.
</x:xsheet>
```

In this example, the "setup" x-cell refers to the "init" x-cell, and the "calculate" x-cell, via its "uses" attributes, refers to the "action" and "setup" x-cells. Accordingly, the "setup" x-cell will be executed after the "init" x-cell. Similarly, the "calculate" x-cell with be executed after "setup" x-cell as well as the "action" x-cell. [The relative order between the "action" x-cell and the "setup" x-cell is considered "undefined".]

Additionally, in support of development of Internet applications, an x-cell, the "header" x-cell, is reserved for the specification of the "meta data", such as defining Java functions used by other x-cells, defining caching policies for the data processing specification, defining user authentication information, editing state, and so forth. An example "header" x-cell may be specified as follows:

```
<x:header name="coolsheet">
    <lastmod>August 19, 2000</lastmod>
    <editstate>
        <cursorpos>4</cursorpo>
        <windowsize>
            <width>1432</lwidth>
            <height>323</height>
        </windowsize>
    </editstate>
</x:header>
```

Further, a "process-content" attribute, set to either "true/false", is supported to facilitate specification of the manner in which an HTTP request is to be processed. Such a request may be received when a x-sheet is hosted as a servlet. In one embodiment, when the attribute is not specified or set to "false", a HTTP request is read and converted to XML on behalf of the x-sheet. However, if the "process-content" attribute is set to "true", the input is left in the CGU-style format, allowing the x-sheet to read the body of the HTTP request itself.

In summary, x-cell elements are children of a x-sheet element. Each x-cell element has a name attribute uniquely naming the x-cell. The names "output" and "header" are reserved. Each x-cell may also have one or more attributes, including a use attribute referencing other x-cells.

X-Cell Formulas

Turning now to x-cell formulas 110 of the present invention, and still referring to FIG. 1, as described earlier, each x-cell formula 110 is employed to specify an action or computation. As illustrated, at least one mnemonic (e.g. $input) 112 is reserved for providing input to the specified data processing. Further, a number of "operator" elements are supported to facilitate specification of the actions or computations. In one embodiment, the operator elements include:

- select
- value of
- content of
- copy of
- if
- for

The "Select" Element

Each "select" element has a path, and is used to select a portion of an inner value of the path. As illustrated in some of the earlier examples, the path may point to another x-cell. Consider the following example

```
<x:output>
    The authority is: <myfunc:currentuser x:select="user/authority"/>
</x:output>
```

In this example, assuming "user" is an XML record with "authority" set to "supervisor", the output of the example would be The authority is: supervisor The "Value of" Element Each "value-of" element also has a path, and is used to produce text results from the path specified by the select attribute. As also illustrated in some of the earlier examples, the path may point to another x-cell. Consider the following example

```
<x:value-of select="$input/parameters/record"/>
```

In this example, assuming also "parameter" is an XML record with "record" having "first" and "last" elements set to "John" and "Doe", the output of the example would be JohnDoe.

The "Content of" Element

Each "content-of" element also has a path, and is used to produce XML results from the path specified by the select attribute. Similar to the value-of and select attributes, the path may point to another x-cell. Consider the earlier example again

```
<x:content-of select="$input/parameters/record"/>
```

Assuming again "parameter" is an XML record with "record" having "first" and "last" elements set to "John" and "Doe", the output of the example would be

```
<first>John</first>
<last>Doe</lase>.
```

In other words, the difference between "value-of" and "content-of" is that in the earlier case, the delimiters or tags are removed, whereas in the later case, they are not removed.

The "Copy of" Element

Each "copy-of" element also has a path, and is used to produce a node set from the path specified by the select attribute. Also similar to the earlier described attributes, the path may point to another x-cell. Consider the example

```
<x:copy-of select="$input/parameters/record"/>
```

In this example, all the records delineated between the "parameter" tags, i.e. <parameter> . . . are output, which may be

```
<record>
    <first>John</first>
    <last>Doe</last>.
</record>
```

```
<record>
    <first>Jane</first>
    <last>Doe</last>.
</record>
``` assuming these "records" are contents of the input "parameters".

The "if" Element

The "if" element is used to perform a single Boolean test, causing either a <x:then> or a <x:else> section to be executed depending on the result of the test (naturally, the <x:then> section is executed if the test is true, and the <x:else> section is executed if the test is false). Consider the following example

```
<x:if>
    <x:test x:select="./actual = ./submitted">
        <actual><x:value-of select="$realpassword"/></actual>
        <submitted><x:value-of select="$typedpassword"/></submitted>
    </x:test>
    <x:then>
        <message>Right password! Welcome to the secret area.</message>
        <result>ok</result>
    </x:then>
    <x:else>
        <message>Sorry! Only members allowed.</message>
        <result>reject</result>
    </x:else>
</x:if>
```

In this example, the contents of the <x:test> section is evaluated. The result is a document fragment containing the elements <actual> and <submitted> with some values inside them. The local path in the "x:select" attribute on the <x:test> element is executed in the context of the document fragment result of the test. The result of the path is casted to a path Boolean. Lastly, if the Boolean result was true, the <x:then> section is evaluated and its contents become the value of the <x:if>. If the Boolean result was false, the <x:else> section is evaluated and its contents become the value of the <x:if>.

The "for" Element

The "or" element is used to facilitate iteration over a list of nodes. Consider the following example

```
<x:for var="rec">
    <x:each x:select="record">
        <record><first>John</first><last>Doe</last></record>
        <record><first>Jane</first><last>Doe</last></record>
    </x:each>
    <x:do>
        <log:output>
            <message>Hello <x:value-of select="$rec/first"/></message>
        </log:output>
    </x:do>
</x:for>
```

In this example, the contents of the <x:each> section is evaluated first. If a "x:select" attribute is present, it is evaluated and its result is interpreted as a node list (i.e. not a single node). In this case, the node list has two nodes: the two <record> elements. The name "$rec" is bound to each of the nodes in the list, beginning with the first. If the name shadows other name that is in scope, it is an error. That is, if there is a <x:xcell> names "rec" or and out <x:for> using a variable called "rec", an error will be signaled. If no error, for each of nodes in the list, the contents of the <x:do> section is evaluated once. The value of the <x:for> if the document fragment containing the concatenated values of all the evaluated <x:do> sections. Outside the <x:for>, the variable <$rec> is meaningless, and any reference would be signaled as an error.

X-Sheet Execution Analyzer

Figure 2:
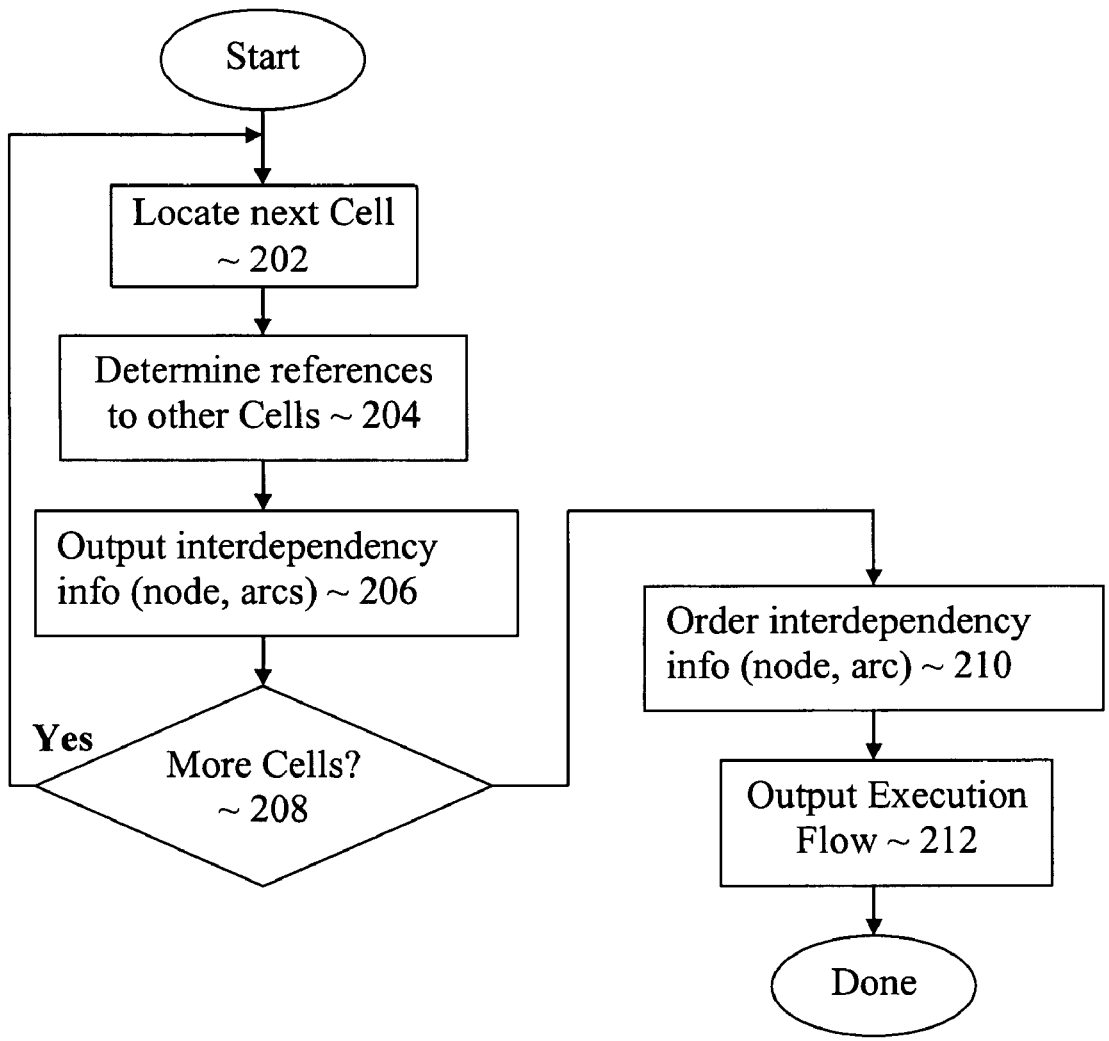
FIG. 2 illustrates the relevant operational flow of the x-sheet execution analyzer of FIG. 1, in accordance with one embodiment.
Figures 3A, 3B:
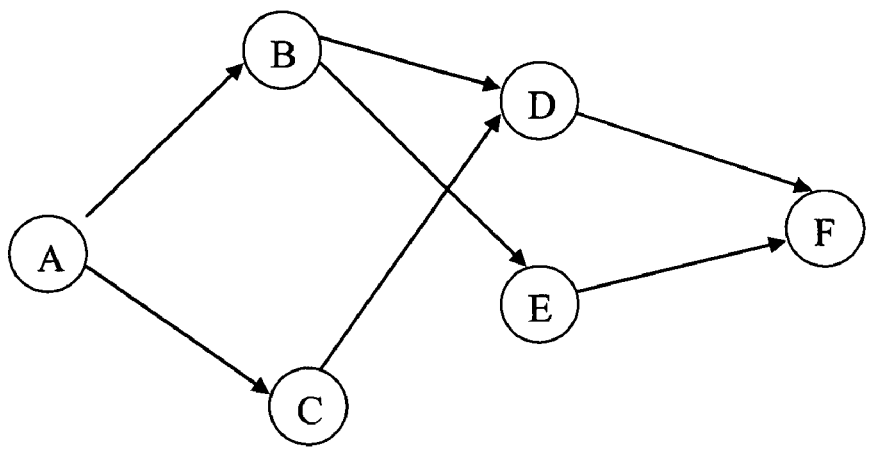
FIGS. 3a-3b illustrate a graphical representation of an example execution flow, and an example data structure suitable for use to represent the example execution flow.

As described earlier, a x-sheet execution analyzer is provided to parse and analyze an x-sheet to determine the execution flow of the x-cells. FIG. 2 illustrates the operational flow of the relevant aspects of x-sheet execution analyzer 122 in accordance with one embodiment, whereas FIGS. 3a-3b illustrate a graphical representation of an example execution flow, and an example data structure for representing the execution flow.

As illustrated, upon invocation, i.e. provided with an x-sheet for analysis, analyzer 122 would locate the next cell, block 202. Recall that in one embodiment, each x-cell is delineated by beginning and ending x-cell tags. Locating these tags may be accomplished using anyone of a number of parsing techniques known in the compiler art. Upon locating the next x-cell, analyzer 122 would determine if the located x-cell references other x-cells, either by way of the "use" attribute, or by virtue of its formulas, block 204. Similarly, detection of the present of certain attributes and syntactical elements may be accomplished using any syntax analysis techniques known in the compiler art.

Next, for the illustrated embodiment, upon determining the "interdependency" of the x-cell being analyzed with other x-cells, the interdependency information are output, block 206. In one embodiment, the interdependency information are maintained by way of a directed graph (logically speaking) [see e.g. FIG. 3a.]. The data associated with the nodes and arcs of the logical graphic representations may be stored in any one of a number of suitable data structures known in the art, e.g. the tabular data structure illustrated in FIG. 3b.

Thereafter, analyzer 122 determines if additional x-cells are present and to be analyzed, block 208. If additional x-cells are present and to be analyzed, the process continues back at block 202. On the other hand, if all x-cells have been analyzed, the cumulated interdependency information are ordered, block 210, and then output as execution flow 132, block 212.

X-Sheet Execution Engine

Figure 4:
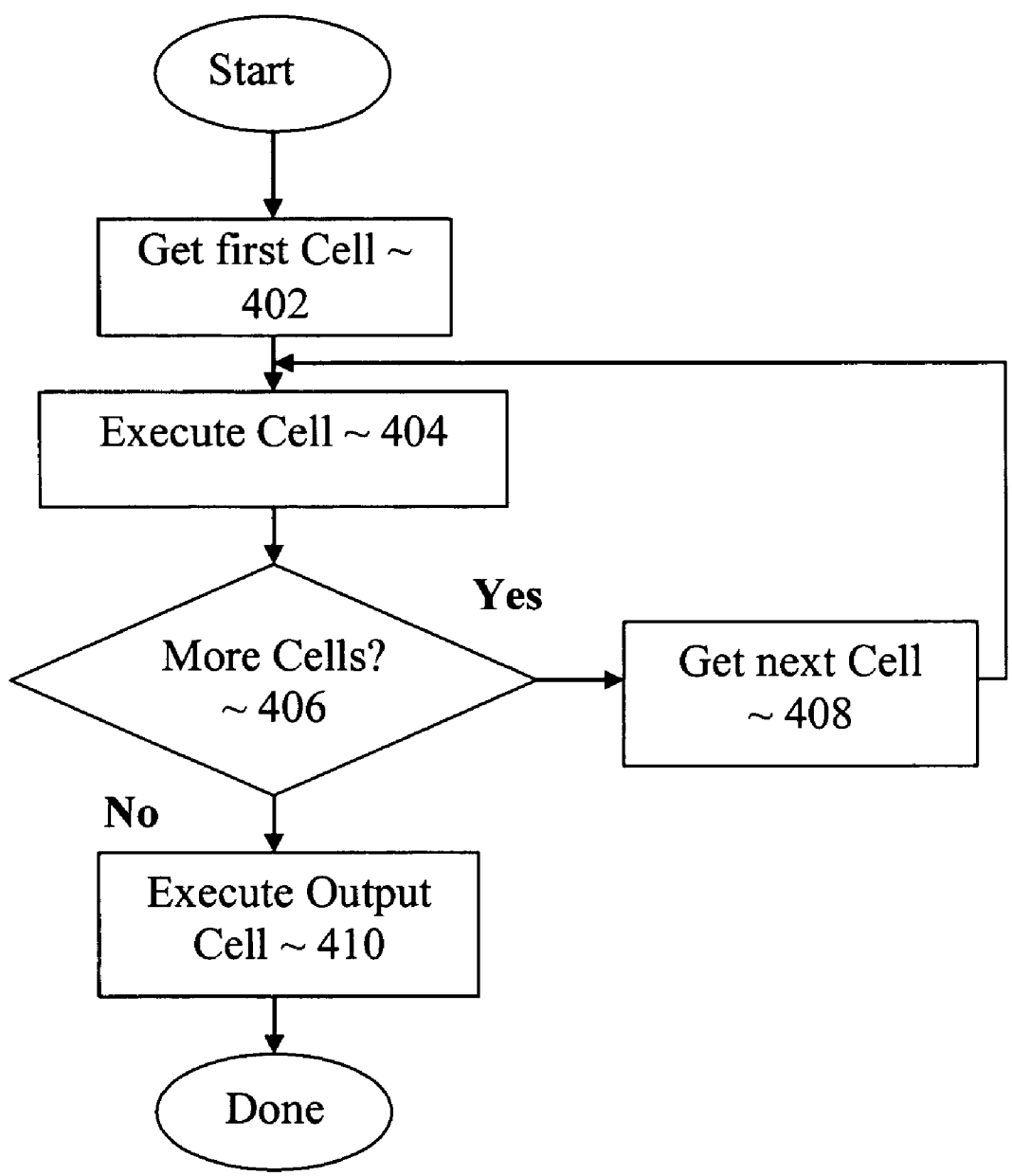
FIG. 4 illustrates the relevant operational flow of the x-sheet execution engine of FIG. 1, in accordance with one embodiment.

As described earlier, a x-sheet execution engine is provided to execute the x-sheets in accordance with their determined execution flows. FIG. 4 illustrates the operational flow of the relevant aspects of x-sheet execution engine 124 in accordance with one embodiment.

As illustrated, upon invocation, i.e. provided with an analyzed x-sheet for execution, execution engine 124 would locate the first cell to be evaluated, as described by execution flow 132, block 402. Upon identifying the first x-cell to be evaluated, execution engine 124 proceeds to evaluate or facilitate to have the formulas evaluated, block 404. The formulas are evaluated in accordance with the semantic meaning of the formula elements (i.e. x:select, x:value-of, x:content-of, x:copy-of and so forth), as described above. Evaluation of the these supported elements in accordance with their semantic meanings may similarly be accomplished using any one of a number of techniques known in the art for executing like kinds of elements in other languages.

After evaluating the first x-cell, execution engine 124 proceeds to determine if additional x-cells are to be executed, again in accordance with execution flow 132, block 406. If additional x-cells are to be executed, execution engine 124 "loads" the next x-cell for evaluations, block 408. From block 408, the process returns back to block 404. On the other hand, if all x-cells have been evaluated, the process terminates.

Example Computer System

Figure 5:
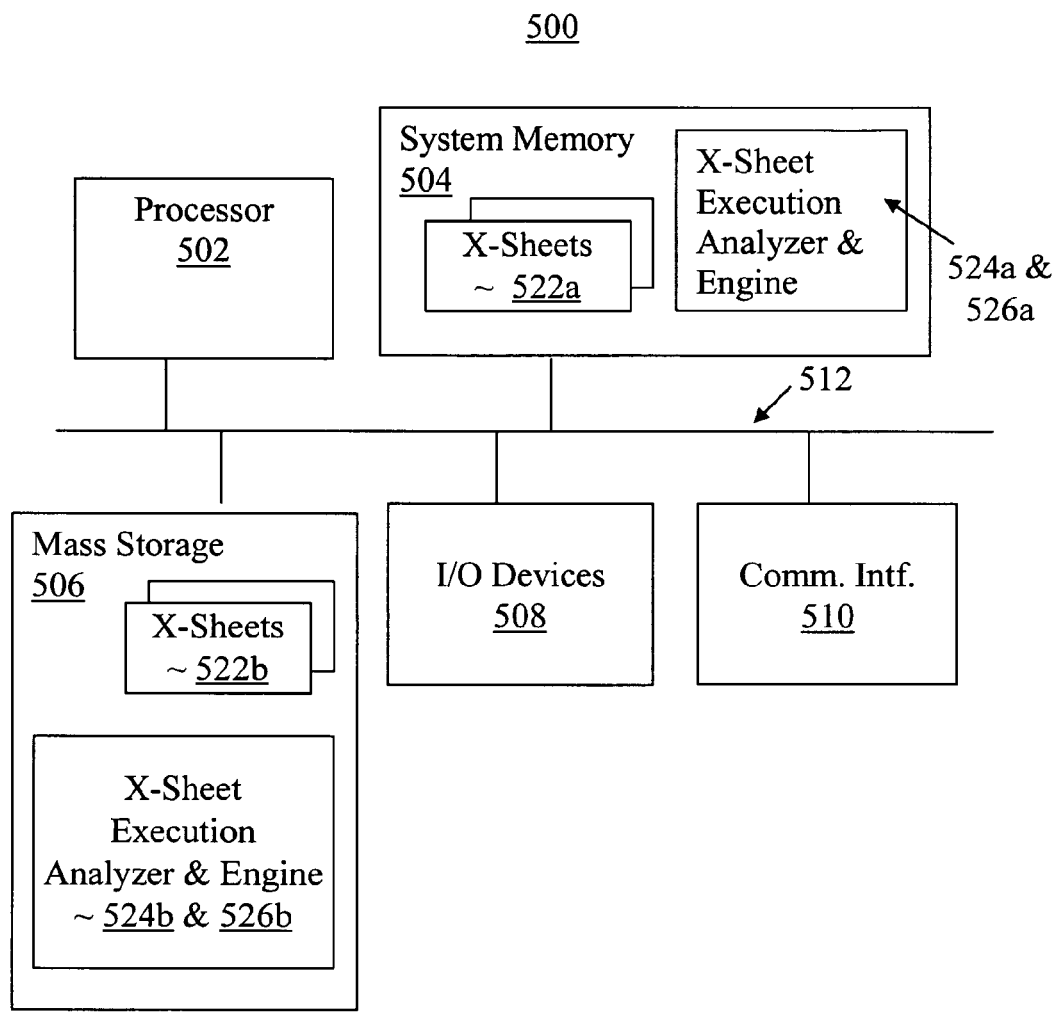
FIG. 5 illustrates a computer system suitable for use to practice the present invention, in accordance with one embodiment.

FIG. 5 illustrates a computer system suitable for use to practice the present invention, in accordance with one embodiment. As shown, computer system 500 includes one or more processors 502 and system memory 504. Additionally, computer system 500 includes mass storage devices 506 (such as diskette, hard drive, CDROM and so forth), input/output devices 508 (such as keyboard, cursor control and so forth) and communication interfaces 510 (such as network interface cards, modems and so forth). The elements are coupled to each other via system bus 512, which represents one or more buses. In the case of multiple buses, they are bridged by one or more bus bridges (not shown). Each of these elements performs its conventional functions known in the art. In particular, system memory 504 and mass storage 506 are employed to store a working copy and a permanent copy of the programming instructions implementing the x-sheet data processing specifications, and their execution analyzer and engine. The permanent copy of the programming instructions may be loaded into mass storage 506 in the factory, or in the field, as described earlier, through a distribution medium (not shown) or through communication interface 510 (from a distribution server (not shown). The constitution of these elements 502-512 are known, and accordingly will not be further described.

Conclusion and Epilogue

Thus, it can be seen from the above descriptions, a novel method and apparatus for specifying data processing, and effectuating the specified data processing have been described. While the present invention has been described in terms of the above illustrated embodiments, those skilled in the art will recognize that the invention is not limited to the embodiments described. The present invention can be practiced with modification and alteration within the spirit and scope of the appended claims. For examples, the present invention may be practiced with or without reserved output cells, input mnemonics, etc. The description is thus to be regarded as illustrative instead of restrictive on the present invention.

What is claimed is:

1. A computer-implemented method of cell-based data processing that facilitates the execution of computer programming code by a computer system, the method comprising:

receiving as input computer code a data processing specification comprising a plurality of cells, wherein each cell comprises a formula specifying an action or computation to perform when the cell is executed, and one or more attributes referencing other cells, wherein the formula of a first cell may reference a value of a second cell;

wherein each cell is delineated by a beginning and ending tag, and one of the cells is reserved as an output cell for outputting a result of the processing;

parsing the specification to determine an interdependency of the plurality of cells and generating and storing a directed graph of the interdependency as an execution flow; and executing the computer code of the specification in accordance with the execution flow, wherein the executing comprises evaluating the formula of each cell in the execution flow and generating an output result;

wherein each cell is interlocked with at least one other cell through the formula or attribute of each cell.

2. The method of claim 1, wherein the first cell has a first attribute referencing a second attribute of said second cell.

3. The method of claim 1, wherein said second cell comprises a reserved mnemonic for providing input to the data processing specified by the data processing specification.

4. The method of claim 1, wherein said first cell is a reserved output cell specification specifying output of the data processing specified by the data processing specification.

5. The method of claim 1, wherein said second cell comprises a conditionally executed formula.

6. The method of claim 1, wherein said data processing specification further includes one or more global attributes specifying one or more global processing characteristics for the specified data processing.

7. The method of claim 6, wherein said one or more global attributes include a global attribute specifying a format for providing the specified data processing with an HTTP request.

8. An apparatus comprising:
at least one storage unit having stored thereon programming instructions that are configured to be executed by a computer processor and designed to:
receive as input computer code a data processing specification comprising a plurality of cells, wherein each cell comprises a formula specifying an action or computation to perform when the cell is executed, and one or more attributes referencing other cells, wherein the formula of a first cell may reference a value of a second cell;
wherein each cell is delineated by a beginning and ending tag, and one of the cells is reserved as an output cell for outputting a result of the processing;
parse the specification to determine an interdependency of the plurality of cells and generating and storing a directed graph of the interdependency as an execution flow; and
execute the computer code of the specification in accordance with the execution flow, wherein the executing comprises evaluating the formula of each cell in the execution flow and generating an output result;
wherein each cell is interlocked with at least one other cell through the formula or attribute of each cell; and
at least one processor coupled to said at least one storage unit to execute said programming instructions.

9. The apparatus of claim 8, wherein said programming instructions are designed to support the first cell having a first attribute referencing a second attribute of said second cell.

10. The apparatus of claim 8, wherein said programming instructions are designed to support said second cell having a reserved mnemonic for facilitating provision of input to the data processing specified by the data processing specification.

11. The apparatus of claim 8, wherein said programming instructions are designed to support said first cell being a reserved output cell specification specifying output of the data processing specified by the data processing specification.

12. The apparatus of claim 8, wherein said programming instructions are designed to support said second cell having a conditionally executed formula.

13. The apparatus of claim 8, wherein said programming instructions are designed to support said data processing specification having one or more global attributes specifying one or more global processing characteristics for the specified data processing.

14. The apparatus of claim 13, wherein said programming instructions are designed to support one of said one or more global attributes being a global attribute specifying a format for providing the specified data processing with an HTTP request.

15. A computer with a memory having stored thereon instructions that when executed cause to the computer to implement data processing comprising:
means for receiving a data processing specification comprising a plurality of cells, wherein each cell comprises a formula specifying an action or computation to perform when the cell is executed, and one or more attributes referencing other cells, wherein the formula of a first cell may reference a value of a second cell;
wherein each cell is delineated by a beginning and ending tag, and one of the cells is reserved as an output cell for outputting a result of the processing;
means for parsing the specification to determine an interdependency of the plurality of cells and generating and storing a directed graph of the interdependency as an execution flow; and
means for executing the specification in accordance with the execution flow, wherein the executing comprises evaluating the formula of each cell in the execution flow and generating an output result;
wherein each cell is interlocked with at least one other cell through the formula or attribute of each cell.

* * * * *

UNITED STATES PATENT AND TRADEMARK OFFICE
CERTIFICATE OF CORRECTION

PATENT NO. : 8,312,429 B2
APPLICATION NO. : 09/741219
DATED : November 13, 2012
INVENTOR(S) : Bosworth et al.

It is certified that error appears in the above-identified patent and that said Letters Patent is hereby corrected as shown below:

In column 3, line 45, delete "ballon" and insert -- balloon --, therefor.

In column 5, line 48, delete "lase" and insert -- last --, therefor.

In column 6, line 43, delete ""or"" and insert -- "for" --, therefor.

Signed and Sealed this
Fifth Day of February, 2013

Teresa Stanek Rea
*Acting Director of the United States Patent and Trademark Office*